US008321682B1

(12) United States Patent
Read et al.

(10) Patent No.: US 8,321,682 B1
(45) Date of Patent: Nov. 27, 2012

(54) SYSTEM AND METHOD FOR GENERATING AND MANAGING ADMINISTRATOR PASSWORDS

(75) Inventors: Matthew J. Read, Oakland, CA (US); Craig S. Ames, Laguna Niguel, CA (US); Vinit Nangia, Dix Hills, NY (US); Pavel Lobashov, Brooklyn, NY (US); Josiah Lam, Hong Kong (CN)

(73) Assignee: JPMorgan Chase Bank, N.A., New York, NY (US)

( * ) Notice: Subject to any disclaimer, the term of this patent is extended or adjusted under 35 U.S.C. 154(b) by 390 days.

(21) Appl. No.: 12/360,100

(22) Filed: Jan. 26, 2009

Related U.S. Application Data

(60) Provisional application No. 61/023,347, filed on Jan. 24, 2008.

(51) Int. Cl.
G06F 21/00 (2006.01)
H04L 9/00 (2006.01)
(52) U.S. Cl. .......................................... 713/183; 380/44
(58) Field of Classification Search .................. 713/183, 713/184; 380/44; 235/382, 382.5
See application file for complete search history.

(56) References Cited

U.S. PATENT DOCUMENTS

| | | |
|---|---|---|
| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |

(Continued)

FOREIGN PATENT DOCUMENTS

CA 2430549 6/2002

(Continued)

OTHER PUBLICATIONS

Philip Carden, The New Face of Single Sign-On, Network Computing (Mar. 22, 1999), http://www.networkcomputing.com/1006/1006f1.html.

(Continued)

*Primary Examiner* — Nathan Flynn
*Assistant Examiner* — Abdullah Almamun
(74) *Attorney, Agent, or Firm* — Lowenstein Sandler PC

(57) ABSTRACT

A password management system and method for securing networked client terminals and mobile devices is provided. More specifically, the present invention provides a system and method for encrypting randomly generated administrator-level passwords and providing a means for decrypting the randomly generated passwords for single-use unrestricted access to a designated terminal or mobile device. When unrestricted access to the terminal or mobile device is required, the encrypted administrator-level password is decrypted using a shared symmetric key, which is generated during encryption of the administrator password, to reveal the administrator-level password for the terminal or mobile device. The administrator-level password is a single-use password, wherein upon use of the administrator-level password a new administrator-level password may be automatically generated for the corresponding terminal or mobile device.

9 Claims, 4 Drawing Sheets

U.S. PATENT DOCUMENTS

| | | | |
|---|---|---|---|
| 4,800,590 A * | 1/1989 | Vaughan | 713/184 |
| 4,801,787 A | 1/1989 | Suzuki | |
| 4,823,264 A | 4/1989 | Deming | |
| 4,882,675 A | 11/1989 | Nichtberger et al. | |
| 4,926,255 A | 5/1990 | Von Kohorn | |
| 4,941,090 A | 7/1990 | McCarthy | |
| 4,964,043 A | 10/1990 | Galvin | |
| 4,992,940 A | 2/1991 | Dworkin | |
| 5,016,270 A | 5/1991 | Katz | |
| 5,050,207 A | 9/1991 | Hitchcock | |
| 5,084,816 A | 1/1992 | Boese | |
| 5,117,355 A | 5/1992 | McCarthy | |
| 5,157,717 A | 10/1992 | Hitchcock | |
| 5,189,606 A | 2/1993 | Burns et al. | |
| 5,202,826 A | 4/1993 | McCarthy | |
| 5,212,792 A | 5/1993 | Gerety et al. | |
| 5,233,654 A | 8/1993 | Harvey et al. | |
| 5,235,509 A | 8/1993 | Mueller et al. | |
| 5,241,594 A | 8/1993 | Kung | |
| 5,265,033 A | 11/1993 | Vajk | |
| 5,287,268 A | 2/1994 | McCarthy | |
| 5,297,026 A | 3/1994 | Hoffman | |
| 5,315,504 A | 5/1994 | Lembie | |
| 5,317,683 A | 5/1994 | Hager et al. | |
| 5,321,841 A | 6/1994 | East | |
| 5,351,186 A | 9/1994 | Bullock | |
| 5,381,332 A | 1/1995 | Wood | |
| 5,412,708 A | 5/1995 | Katz | |
| 5,420,405 A | 5/1995 | Chasek | |
| 5,446,740 A | 8/1995 | Yien | |
| 5,450,134 A | 9/1995 | Legate | |
| 5,450,537 A | 9/1995 | Hirai et al. | |
| 5,465,206 A | 11/1995 | Hilt et al. | |
| 5,467,269 A | 11/1995 | Flaten | |
| 5,473,143 A | 12/1995 | Vak | |
| 5,473,732 A | 12/1995 | Change | |
| 5,479,530 A | 12/1995 | Nair et al. | |
| 5,511,117 A | 4/1996 | Zazzera | |
| 5,513,102 A | 4/1996 | Auriemma | |
| 5,532,920 A | 7/1996 | Hartrick | |
| 5,534,855 A | 7/1996 | Shockley et al. | |
| 5,537,314 A | 7/1996 | Kanter | |
| 5,537,473 A | 7/1996 | Saward | |
| 5,544,086 A | 8/1996 | Davis et al. | |
| 5,551,021 A | 8/1996 | Harada | |
| 5,557,334 A | 9/1996 | Legate | |
| 5,557,518 A | 9/1996 | Rosen | |
| 5,560,008 A | 9/1996 | Johnson et al. | |
| 5,568,489 A | 10/1996 | Yien | |
| 5,570,295 A | 10/1996 | Isenberg | |
| 5,570,465 A | 10/1996 | Tsakanikas | |
| 5,576,951 A | 11/1996 | Lockwood | |
| 5,583,778 A | 12/1996 | Wind | |
| 5,590,199 A | 12/1996 | Krajewski et al. | |
| 5,592,378 A | 1/1997 | Cameron | |
| 5,592,553 A | 1/1997 | Guski et al. | |
| 5,592,560 A | 1/1997 | Deaton et al. | |
| 5,594,837 A | 1/1997 | Noyes | |
| 5,598,557 A | 1/1997 | Doner | |
| 5,602,936 A | 2/1997 | Green | |
| 5,603,025 A | 2/1997 | Tabb | |
| 5,604,490 A | 2/1997 | Blakley et al. | |
| 5,606,496 A | 2/1997 | D'Agostino | |
| 5,611,052 A | 3/1997 | Dykstra | |
| 5,621,201 A | 4/1997 | Langhans | |
| 5,621,789 A | 4/1997 | McCalmont | |
| 5,621,812 A | 4/1997 | Deaton et al. | |
| 5,625,767 A | 4/1997 | Bartell | |
| 5,634,101 A | 5/1997 | Blau | |
| 5,638,457 A | 6/1997 | Deaton et al. | |
| 5,640,577 A | 6/1997 | Scharmer | |
| 5,642,419 A | 6/1997 | Rosen | |
| 5,644,493 A | 7/1997 | Motai | |
| 5,644,778 A | 7/1997 | Burks et al. | |
| 5,649,118 A | 7/1997 | Carlisle et al. | |
| 5,653,914 A | 8/1997 | Holmes et al. | |
| 5,657,383 A | 8/1997 | Gerber | |
| 5,659,165 A | 8/1997 | Jennings | |
| 5,661,807 A | 8/1997 | Guski et al. | |
| 5,664,115 A | 9/1997 | Fraser | |
| 5,666,493 A | 9/1997 | Wojcik et al. | |
| 5,671,285 A | 9/1997 | Newman | |
| 5,675,637 A | 10/1997 | Szlam et al. | |
| 5,675,662 A | 10/1997 | Deaton et al. | |
| 5,677,955 A | 10/1997 | Doggett et al. | |
| 5,678,046 A | 10/1997 | Cahill et al. | |
| 5,682,524 A | 10/1997 | Freund | |
| 5,684,870 A | 11/1997 | Maloney | |
| 5,687,322 A | 11/1997 | Deaton et al. | |
| 5,689,100 A | 11/1997 | Carrithers et al. | |
| 5,692,132 A | 11/1997 | Hogan | |
| 5,699,528 A | 12/1997 | Hogan | |
| 5,703,344 A | 12/1997 | Bezy et al. | |
| 5,706,452 A | 1/1998 | Ivanov | |
| 5,710,886 A | 1/1998 | Christensen et al. | |
| 5,710,887 A | 1/1998 | Chelliah | |
| 5,710,889 A | 1/1998 | Clark et al. | |
| 5,715,298 A | 2/1998 | Rogers | |
| 5,715,314 A | 2/1998 | Payne | |
| 5,715,399 A | 2/1998 | Bezos | |
| 5,715,402 A | 2/1998 | Popolo | |
| 5,715,450 A | 2/1998 | Ambrose | |
| 5,724,424 A | 3/1998 | Gifford | |
| 5,727,163 A | 3/1998 | Bezos | |
| 5,734,838 A | 3/1998 | Robinson | |
| 5,737,414 A | 4/1998 | Walker et al. | |
| 5,740,231 A | 4/1998 | Cohn et al. | |
| 5,754,840 A | 5/1998 | Rivette | |
| 5,758,126 A | 5/1998 | Daniels et al. | |
| 5,758,328 A | 5/1998 | Giovannoli | |
| 5,761,288 A | 6/1998 | Gray | |
| 5,761,647 A | 6/1998 | Boushy | |
| 5,761,661 A | 6/1998 | Coussens | |
| 5,764,789 A | 6/1998 | Pare et al. | |
| 5,765,141 A | 6/1998 | Spector | |
| 5,765,143 A | 6/1998 | Sheldon | |
| 5,768,382 A | 6/1998 | Schnier et al. | |
| 5,774,122 A | 6/1998 | Kojima | |
| 5,778,178 A | 7/1998 | Arunachalam | |
| 5,781,909 A | 7/1998 | Logan et al. | |
| 5,784,562 A | 7/1998 | Diener | |
| 5,787,403 A | 7/1998 | Randle | |
| 5,787,404 A | 7/1998 | Fernandez-Holman | |
| 5,790,650 A | 8/1998 | Dunn | |
| 5,790,785 A | 8/1998 | Klug et al. | |
| 5,793,861 A | 8/1998 | Haigh | |
| 5,794,178 A | 8/1998 | Caid | |
| 5,794,207 A | 8/1998 | Walker | |
| 5,794,259 A | 8/1998 | Kikinis | |
| 5,796,395 A | 8/1998 | De Hond | |
| 5,797,127 A | 8/1998 | Walker et al. | |
| 5,798,508 A | 8/1998 | Walker et al. | |
| 5,802,176 A * | 9/1998 | Audebert | 713/184 |
| 5,802,498 A | 9/1998 | Comesanas | |
| 5,802,502 A | 9/1998 | Gell | |
| 5,805,719 A | 9/1998 | Pare et al. | |
| 5,815,657 A | 9/1998 | Williams et al. | |
| 5,815,665 A | 9/1998 | Teper et al. | |
| 5,815,683 A | 9/1998 | Vogler | |
| 5,818,936 A | 10/1998 | Mashayekhi | |
| 5,819,092 A | 10/1998 | Ferguson | |
| 5,819,285 A | 10/1998 | Damico | |
| 5,825,863 A | 10/1998 | Walker | |
| 5,825,870 A | 10/1998 | Miloslavsky | |
| 5,826,023 A | 10/1998 | Hall et al. | |
| 5,826,241 A | 10/1998 | Stein | |
| 5,826,245 A | 10/1998 | Sandberg-Diment | |
| 5,826,250 A | 10/1998 | Trefler | |
| 5,828,734 A | 10/1998 | Katz | |
| 5,828,751 A | 10/1998 | Walker et al. | |
| 5,828,812 A | 10/1998 | Khan et al. | |
| 5,828,833 A | 10/1998 | Belville et al. | |
| 5,832,211 A | 11/1998 | Blakley, III et al. | |
| 5,832,460 A | 11/1998 | Bednar | |
| 5,832,476 A | 11/1998 | Tada | |
| 5,835,580 A | 11/1998 | Fraser | |
| 5,835,603 A | 11/1998 | Coutts | |

| Patent No. | Date | Inventor(s) |
|---|---|---|
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakley, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Bellinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelley et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |

| | | | | | | |
|---|---|---|---|---|---|---|
| 6,095,412 A | 8/2000 | Bertina et al. | | 6,317,838 B1 | 11/2001 | Baize |
| 6,098,070 A | 8/2000 | Maxwell | | 6,324,524 B1 | 11/2001 | Lent et al. |
| 6,101,486 A | 8/2000 | Roberts et al. | | 6,327,573 B1 | 12/2001 | Walker et al. |
| 6,104,716 A | 8/2000 | Crichton et al. | | 6,327,578 B1 | 12/2001 | Linehan |
| 6,105,012 A | 8/2000 | Chang et al. | | 6,330,543 B1 | 12/2001 | Kepecs |
| 6,105,865 A | 8/2000 | Hardesty | | 6,332,192 B1 | 12/2001 | Boroditsky et al. |
| 6,111,858 A | 8/2000 | Greaves et al. | | 6,336,104 B1 | 1/2002 | Walker et al. |
| 6,112,181 A | 8/2000 | Shear et al. | | 6,339,423 B1 | 1/2002 | Sampson et al. |
| 6,115,642 A | 9/2000 | Brown et al. | | 6,343,279 B1 | 1/2002 | Bissonette et al. |
| 6,115,690 A | 9/2000 | Wong | | 6,343,323 B1 | 1/2002 | Kalpio et al. |
| 6,119,093 A | 9/2000 | Walker et al. | | 6,345,261 B1 | 2/2002 | Feidelson |
| 6,119,099 A | 9/2000 | Walker et al. | | 6,349,242 B2 | 2/2002 | Mahaffey |
| 6,128,599 A | 10/2000 | Walker et al. | | 6,349,336 B1 | 2/2002 | Sit et al. |
| 6,128,602 A | 10/2000 | Northington et al. | | 6,363,381 B1 | 3/2002 | Lee et al. |
| 6,131,810 A | 10/2000 | Weiss et al. | | 6,366,682 B1 | 4/2002 | Hoffman et al. |
| 6,134,549 A | 10/2000 | Regnier et al. | | 6,370,649 B1 * | 4/2002 | Angelo et al. .................. 726/18 |
| 6,134,592 A | 10/2000 | Montulli | | 6,381,587 B1 | 4/2002 | Guzelsu |
| 6,135,349 A | 10/2000 | Zirkel | | 6,385,591 B1 | 5/2002 | Mankoff |
| 6,138,106 A | 10/2000 | Walker et al. | | 6,385,652 B1 | 5/2002 | Brown et al. |
| 6,138,118 A | 10/2000 | Koppstein et al. | | 6,401,125 B1 | 6/2002 | Makarios et al. |
| 6,141,651 A | 10/2000 | Riley et al. | | 6,401,211 B1 | 6/2002 | Brezak, Jr. et al. |
| 6,141,666 A | 10/2000 | Tobin | | 6,408,389 B2 | 6/2002 | Grawrock et al. |
| 6,144,946 A | 11/2000 | Iwamura | | 6,411,933 B1 | 6/2002 | Maes et al. |
| 6,144,948 A | 11/2000 | Walker et al. | | 6,418,457 B1 | 7/2002 | Schmidt et al. |
| 6,145,086 A | 11/2000 | Bellemore et al. | | 6,438,594 B1 | 8/2002 | Bowman-Amuah |
| 6,148,293 A | 11/2000 | King | | 6,438,666 B2 | 8/2002 | Cassagnol et al. |
| 6,151,584 A | 11/2000 | Papierniak et al. | | 6,446,053 B1 | 9/2002 | Elliott |
| 6,154,750 A | 11/2000 | Roberge et al. | | 6,449,765 B1 | 9/2002 | Ballard |
| 6,154,879 A | 11/2000 | Pare et al. | | 6,453,353 B1 | 9/2002 | Win et al. |
| 6,161,113 A | 12/2000 | Mora et al. | | 6,460,141 B1 | 10/2002 | Olden |
| 6,161,182 A | 12/2000 | Nadooshan | | 6,470,357 B1 | 10/2002 | Garcia, Jr. et al. |
| 6,164,533 A | 12/2000 | Barton | | 6,480,958 B1 * | 11/2002 | Harrington .................. 713/184 |
| 6,170,011 B1 | 1/2001 | Beck et al. | | 6,484,149 B1 | 11/2002 | Jammes |
| 6,178,511 B1 | 1/2001 | Cohen et al. | | 6,487,641 B1 | 11/2002 | Cusson et al. |
| 6,182,052 B1 | 1/2001 | Fulton et al. | | 6,490,601 B1 | 12/2002 | Markus et al. |
| 6,182,142 B1 | 1/2001 | Win et al. | | 6,493,677 B1 | 12/2002 | Von Rosen et al. |
| 6,182,220 B1 | 1/2001 | Chen et al. | | 6,493,685 B1 | 12/2002 | Ensel et al. |
| 6,182,225 B1 | 1/2001 | Hagiuda et al. | | 6,496,855 B1 | 12/2002 | Hunt et al. |
| 6,185,242 B1 | 2/2001 | Arthur et al. | | 6,496,936 B1 | 12/2002 | French et al. |
| 6,189,029 B1 | 2/2001 | Fuerst | | 6,498,657 B1 | 12/2002 | Kuntz et al. |
| 6,195,644 B1 | 2/2001 | Bowie | | 6,507,912 B1 | 1/2003 | Matyas et al. |
| 6,199,077 B1 | 3/2001 | Inala et al. | | 6,510,523 B1 | 1/2003 | Perlman et al. |
| 6,201,948 B1 | 3/2001 | Cook et al. | | 6,519,763 B1 | 2/2003 | Kaufer et al. |
| 6,202,005 B1 | 3/2001 | Mahaffey | | 6,526,404 B1 | 2/2003 | Slater et al. |
| 6,202,054 B1 | 3/2001 | Lawlor et al. | | 6,532,284 B2 | 3/2003 | Walker et al. |
| 6,202,066 B1 | 3/2001 | Barkley | | 6,535,855 B1 | 3/2003 | Cahill et al. |
| 6,202,151 B1 | 3/2001 | Musgrave et al. | | 6,535,917 B1 | 3/2003 | Zamanzadeh et al. |
| 6,202,158 B1 | 3/2001 | Urano et al. | | 6,535,980 B1 | 3/2003 | Kumar et al. |
| 6,208,978 B1 | 3/2001 | Walker et al. | | 6,539,424 B1 | 3/2003 | Dutta |
| 6,208,984 B1 | 3/2001 | Rosenthan | | 6,557,039 B1 | 4/2003 | Leong et al. |
| 6,216,115 B1 | 4/2001 | Barrameda et al. | | 6,574,348 B1 | 6/2003 | Venkatesan et al. |
| 6,219,639 B1 | 4/2001 | Bakis et al. | | 6,580,814 B1 | 6/2003 | Ittycheriah et al. |
| 6,219,706 B1 | 4/2001 | Fan | | 6,581,040 B1 | 6/2003 | Wright et al. |
| 6,222,914 B1 | 4/2001 | McMullin | | 6,584,505 B1 | 6/2003 | Howard et al. |
| 6,223,168 B1 | 4/2001 | McGurl et al. | | 6,584,508 B1 | 6/2003 | Epstein et al. |
| 6,226,623 B1 | 5/2001 | Schein et al. | | 6,589,291 B1 | 7/2003 | Boag et al. |
| 6,226,679 B1 | 5/2001 | Gupta | | 6,592,044 B1 | 7/2003 | Wong et al. |
| 6,226,752 B1 | 5/2001 | Gupta et al. | | 6,601,175 B1 * | 7/2003 | Arnold et al. ..................... 726/7 |
| 6,227,447 B1 | 5/2001 | Campisano | | 6,609,106 B1 | 8/2003 | Robertson |
| 6,230,148 B1 | 5/2001 | Pare et al. | | 6,609,113 B1 | 8/2003 | O'Leary et al. |
| 6,243,688 B1 | 6/2001 | Kalina | | 6,609,125 B1 | 8/2003 | Layne et al. |
| 6,243,816 B1 | 6/2001 | Fang et al. | | 6,609,198 B1 | 8/2003 | Wood et al. |
| 6,253,327 B1 | 6/2001 | Zhang et al. | | 6,609,654 B1 | 8/2003 | Anderson et al. |
| 6,253,328 B1 | 6/2001 | Smith, Jr. | | 6,618,579 B1 | 9/2003 | Smith et al. |
| 6,256,664 B1 | 7/2001 | Donoho et al. | | 6,618,806 B1 | 9/2003 | Brown et al. |
| 6,260,026 B1 | 7/2001 | Tomida et al. | | 6,623,415 B2 | 9/2003 | Gates et al. |
| 6,266,648 B1 | 7/2001 | Baker, III | | 6,640,302 B1 | 10/2003 | Subramaniam et al. |
| 6,266,683 B1 | 7/2001 | Yehuda et al. | | 6,668,322 B1 | 12/2003 | Wood et al. |
| 6,267,292 B1 | 7/2001 | Walker et al. | | 6,671,818 B1 | 12/2003 | Mikurak |
| 6,269,348 B1 | 7/2001 | Pare et al. | | 6,675,261 B2 | 1/2004 | Shandony |
| 6,275,944 B1 | 8/2001 | Kao et al. | | 6,684,248 B1 | 1/2004 | Janacek et al. |
| 6,289,322 B1 | 9/2001 | Kitchen et al. | | 6,684,384 B1 | 1/2004 | Bickerton et al. |
| 6,298,330 B1 | 10/2001 | Gardenswartz et al. | | 6,687,222 B1 | 2/2004 | Albert et al. |
| 6,298,356 B1 | 10/2001 | Jawahar et al. | | 6,687,245 B2 | 2/2004 | Fangman et al. |
| 6,301,567 B1 | 10/2001 | Leong et al. | | 6,697,947 B1 | 2/2004 | Matyas, Jr. et al. |
| 6,308,273 B1 | 10/2001 | Goertzel et al. | | 6,714,987 B1 | 3/2004 | Amin et al. |
| 6,308,274 B1 | 10/2001 | Swift | | 6,718,482 B2 | 4/2004 | Sato et al. |
| 6,311,275 B1 | 10/2001 | Jin et al. | | 6,718,535 B1 | 4/2004 | Underwood |
| 6,317,834 B1 | 11/2001 | Gennaro et al. | | 6,725,269 B1 | 4/2004 | Megiddo |

| | | |
|---|---|---|
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 7,571,489 B2 * | 8/2009 | Ong et al. .................. 726/29 |
| 7,840,993 B2 * | 11/2010 | Ganesan et al. .............. 726/7 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzer |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0114470 A1 * | 8/2002 | Mauro et al. ................. 380/270 |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0149594 A1 | 8/2003 | Beazley et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0204460 A1 | 10/2003 | Robinson et al. |
| 2003/0225688 A1 | 12/2003 | Dobbins |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2004/0153378 A1 | 8/2004 | Perkowski |
| 2004/0215514 A1 | 10/2004 | Quinlan et al. |
| 2004/0254991 A1 | 12/2004 | Malik et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0278641 A1 | 12/2005 | Mansour et al. |
| 2006/0000904 A1 * | 1/2006 | Vernay et al. ................. 235/386 |

| | | | |
|---|---|---|---|
| 2006/0029261 | A1 | 2/2006 | Hoffman et al. |
| 2006/0083228 | A1* | 4/2006 | Ong et al. ............... 370/389 |
| 2006/0116949 | A1 | 6/2006 | Wehunt et al. |
| 2006/0198517 | A1* | 9/2006 | Cameron et al. ............ 380/44 |
| 2006/0274970 | A1 | 12/2006 | Seki et al. |
| 2007/0014400 | A1* | 1/2007 | Wack et al. ............... 380/44 |
| 2008/0056499 | A1* | 3/2008 | Vanstone .................. 380/278 |
| 2008/0270791 | A1* | 10/2008 | Nystrom et al. ............ 713/159 |
| 2011/0099614 | A1* | 4/2011 | Ichikawa et al. ............ 726/6 |

FOREIGN PATENT DOCUMENTS

| | | |
|---|---|---|
| DE | 19731293 | 1/1999 |
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-48 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-53 (Mar. 1993).
The check is in the E-mail, Info. Today, Mar. 1, 1995, at 43.
ThomasNet, Inc., http:llwww.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing COBRA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).
ABC News Internet Ventures, Getting Smart with Java, http://abcnews.go.com/sections/DailyNews/amex_java000606.html (last visited Jun. 6, 2000).
Amy Cortese et al, Cyberspace: Crafting software that will let you build a business out there, Bus. Week, Feb. 27, 1995, at 78.
Amy K. Larsen, Internet Goes to Work for Builders, InternetWeek, Nov. 16, 1998, at 26.
Anne Knowles, Improved Internet security enabling on-line commerce, PC Week, Mar. 20, 1995.
Anne Thomas, Sun Microsystems, Enterprise Javabeans Technology, http://java.sun.com (last visited May 21, 1999).
Associates National Bank (Delaware), Our Cards, http://www.theassociates.com (last visited Apr. 6, 1999).
Aversion Therapy: Banks overcoming fear of the 'Net to develop safe Internet-based payment system with Netscape Communicator, Network World, Dec. 12, 1994.
Barry D. Bowen, Sun Microsystems, Banking on JAVA Technology, http://java.sun.com (last visited May 21, 1999).
Bechtel Construction Operations Incorporated Standardizes on Primavera's Expedition Contract Management Software, Bus. Wire, Jul. 27, 1999.
Calyx Software, POINT for Windows Version 3.x Interface Marketing Guide (Dec. 8, 1999).
David Bank, Cash, Check, Charge—What's next?, Seattle Times, Mar. 6, 1995, at D-1.
David D. Owen, Facilities Planning and Relocation 108, 110, 112-114, 117-127, 137-138, 199-217, 241, 359 (R.S. Means Company, Inc. 1993).
David G. Cotts, The Facility Management Handbook 135-40 (2d ed. 1998).
David P. Kormann et al, Risks of the Passport Single Signon Protocol, 33 Computer Networks 51-58 (2000).
David Post, E-Cash: Can't Live With It, Can't Live Without It, Am. Lawyer, Mar. 1995, at 116.
Dominique Deckmyn, San Francisco Manages $45M Project Via Web-Based Service, ComputerWorld, Aug. 9, 1999, at 14.

Don Clark, Microsoft, Visa to Jointly Develop PC Electronic-Shopping Software, Wall St. J., Nov. 9, 1994, at B9.

eCharge Corporation, http://www.echarge.com/company/index.htm (last visited Dec. 3, 1999).

FreeMarkets Online, Inc., http://www.freemarkets.com (last visited Apr. 1999).

G&D America's Multi-application Smart Card Selected for Combined Payroll and 'Virtual Banking' Program in Mexico, Bus. Wire, Apr. 24, 1998.

GE TPN Post Service Use Guidelines, Getting Started (Apr. 26, 1999).

GE TPN Post Service Use Guidelines, Resource Center (Apr. 26, 1999).

Gerry Vandenengel, Cards on the Internet: Advertising on a $3 Bill, World Card Tech., Feb. 1995, at 46.

Harris InfoSource, http://www.harrisinfo.com (last visited Apr. 26, 1999).

Hewlett-Packard Co., Understanding Product Data Management (Apr. 26, 1999).

Jeffrey Kutler, A different drummer on the data highway, Am. Banker, May 12, 1995, at 14.

Jeffrey Kutler, Cash Card Creator Looking Beyond Mondex, Am. Banker, Feb. 9, 1995, at 16.

John N. Frank, Beyond direct mail, Credit Card Mgmt., Aug. 1996, at 54.

Jonathan Berry et al, Database: A Potent New Tool for Selling, Bus. Week, Sep. 5, 1994, at 56.

Karen Epper, A player goes after big bucks in cyberspace, Am. Banker, May 5, 1995, at 17.

Keith Brown, The Builder's Revolution, BuildNet Publishing (1996).

Kennedy Maiz, Fannie Mae on the Web, Newsbyte, May 8, 1995.

Kim A. Strassel, Dutch Software Concern Experiments with Electronic 'Cash' in Cyberspace, Wall St. J., Apr. 17, 1995, at B6.

Ko Fujimura et al, A World Wide Supermarket Scheme Using Rights Trading System, Proc. 7th Int'l Conf. on Parallel and Distributed Systems: Workshops, pp. 289-294 (Jul. 2000).

Ko Fujimura et al, XML Voucher: Generic Voucher Language, Internet Engineering Task Force, http://www.

Lester D. Taylor, Telecommunications Demand Analysis in Transition, IEEE Proc. 31st Int'l Conf. on System Sciences, pp. 409-415 (1998).

Lynda Radosevich, Is workflow working?, CNN.com (Apr. 6, 1999), http://www.cnn.com/TECH/computing/9904/06/workflow.ent.idg.

M. Alshawi et al, An IFC Web-Based Collaborative Construction Computer Environment: Wisper, Proc. Int'l Conf. Construction IT (1999).

Markus Jakobsson et al, Secure and lightweight advertising on the Web, 31 Computer Networks 1101-1109 (1999).

Marvin Sirbu et al, NetBill: An Internet Commerce System Optimized for Network Delivered Services, IEEE Personal Comm., pp. 34-39 (Aug. 1995).

Mary C. Lacity et al, The Information Systems Outsourcing Bandwagon, 35 Sloan Mgmt. Rev. 73 (1993).

Method of Protecting Data on a Personal Computer, IBM Technical Disclosure Bulletin 26:6, p. 2530 (Nov. 1985).

Muse Technologies, Inc., http://www.musetechnologies.com (last visited Apr. 26, 1999).

Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).

Object Management Group, COBRA for Beginners, http://www.omg.org (last visited May 25, 1999).

Object Management Group, COBRA Overview, http://pent21.infosys.tuwein.ac.at (last visited May 25, 1999).

Object Management Group, Library, http://www.omg.org (last visited May 25, 1999).

Object Management Group, What is COBRA?, http://www.omg.org (last visited May 25, 1999).

Omware, Inc., http://web.archive.org/web/20000226033405/www.omware.com/products.html (last visited Nov. 28, 2005).

Paul Seibert, Facilities Planning & Design for Financial Institutions 15, 272, 274-77 (1996).

\* cited by examiner

SYSTEM AND METHOD FOR GENERATING AND MANAGING ADMINISTRATOR PASSWORDS

CROSS-REFERENCE TO RELATED APPLICATIONS

This application claims the benefit of priority under 35 U.S.C. §119(e) to U.S. Provisional Patent Application No. 61/023,347, filed Jan. 24, 2008, which is incorporated by reference herein in its entirety.

BACKGROUND OF THE INVENTION

1. Field of the Invention

The present invention relates generally to computer security. More specifically, the present invention is directed at a system and method for generating and managing an administrator-level password unique to a workstation residing on a defined network.

2. Description of the Prior Art

Computer security is a significant issue for network administrators. With the vast amount of sensitive data residing on and accessible through computer networks, the likelihood and consequences of a security breach is a constant concern. These concerns have commonly been addressed by network administrators through the implementation of various end-user restrictions and strict guidelines directed at minimizing potential threats. While these measures can be used as an effective measure for securing access to a network, an often unintended result is reduced access for authorized users.

Given that the need to provide an effective level of network security is often at odds with the need to provide adequate access to support a network, administrators are constantly faced with the burden of discerning to what extent one interest must override the other. The management of administrator-level passwords, which typically provide unrestricted access to workstations, is a prime example of this problem.

An administrator-level password is often provided to various technical support professionals to provide immediate access to a workstation in need of support. In providing such access, many organizations typically utilize a limited number of administrator-level passwords that can be shared among authorized professionals. These shared administrator-level passwords are frequently referred to as common administrator passwords and permit the holder to obtain unrestricted access to a workstation without having knowledge of a user-defined password associated with the workstation.

Although the foregoing measure provides a certain level of security, while relieving the burden of having to manage and secure a repository of unique administrator-level passwords for each workstation on a network, the very existence of common administrator passwords present a serious security risk since any individual with knowledge of at least one of these passwords may obtain unrestricted access to any number of workstations on the network.

In view of the foregoing inherent security concerns related with conventional methods, it is desirable to provide an improved means for securing individual workstations on a defined network. Accordingly, a system and method for generating and managing an administrator-level password unique to each workstation residing on a defined network is provided by the present invention.

SUMMARY OF THE INVENTION

Preferred embodiments of the present invention are deployed in two phases. In the first phase, a unique administrator-level password is randomly generated for a computer terminal or mobile device and encrypted to create a breakglass string, the breakglass string being visibly accessible to a user of the workstation or mobile device or, alternatively, retrievable from a corresponding server database. In the second phase, the breakglass string is decrypted by an authorized user to reveal the uniquely generated administrator-level password associated with the workstation or mobile device.

The breakglass string may be a string of characters in the form of cipher text representing the encrypted administrator-level password randomly generated for and unique to a particular terminal or mobile device. When the cipher text is decrypted and the administrator-level password for accessing the corresponding terminal or mobile device is revealed, the breakglass string is deemed obsolete and a new unique administrator-level password is automatically generated and encrypted for the terminal or mobile device being accessed. Therefore, once revealed, the administrator-level password can not be used again for regaining access to the same terminal or mobile device, thereby providing a secure single-use administrator-level password.

In the first phase of the present invention, a string of random characters representing an administrator-level password, or any other applicable password, is automatically generated for a target terminal. A Random Password Management (RPM) agent, which may be an application residing locally on the target terminal or made accessible via a remote server, may be configured to generate the random string of characters representing the administrator-level password and a symmetric secret key for encrypting the same. The symmetric secret key may be generated by retrieving public and private keys associated with the target terminal deploying the RPM agent, an RPM server public key, and a unique identifier associated with the target terminal.

Once generated, the symmetric secret key is applied to the randomly generated administrator-level password in a symmetric encryption scheme, thereby yielding a breakglass string of characters. In a preferred embodiment of the present invention the breakglass string is stored in the registry and displayed on the target terminal. For example, the breakglass string may be embedded in the wallpaper of a desktop environment displayed on the monitor of the target terminal. Alternatively, the breakglass string may also be stored in a server database to allow authorized users to obtain access to the target terminal.

When access to the target terminal is required by an authorized user, the second phase of the present invention is deployed. The breakglass string, along with a unique identifier for the target terminal, is retrieved through a Random Password Recovery System (RPRS), which may be deployed from a remote terminal and coupled to an RPM database server, to decrypt the breakglass string and reveal the administrator-level password for accessing the target terminal. Thereafter, the RPM agent may be configured to automatically generate a new unique administrator-level password for encryption in connection with the target terminal.

BRIEF DESCRIPTION OF THE DRAWINGS

The above and other objects and advantages of the present invention will become apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
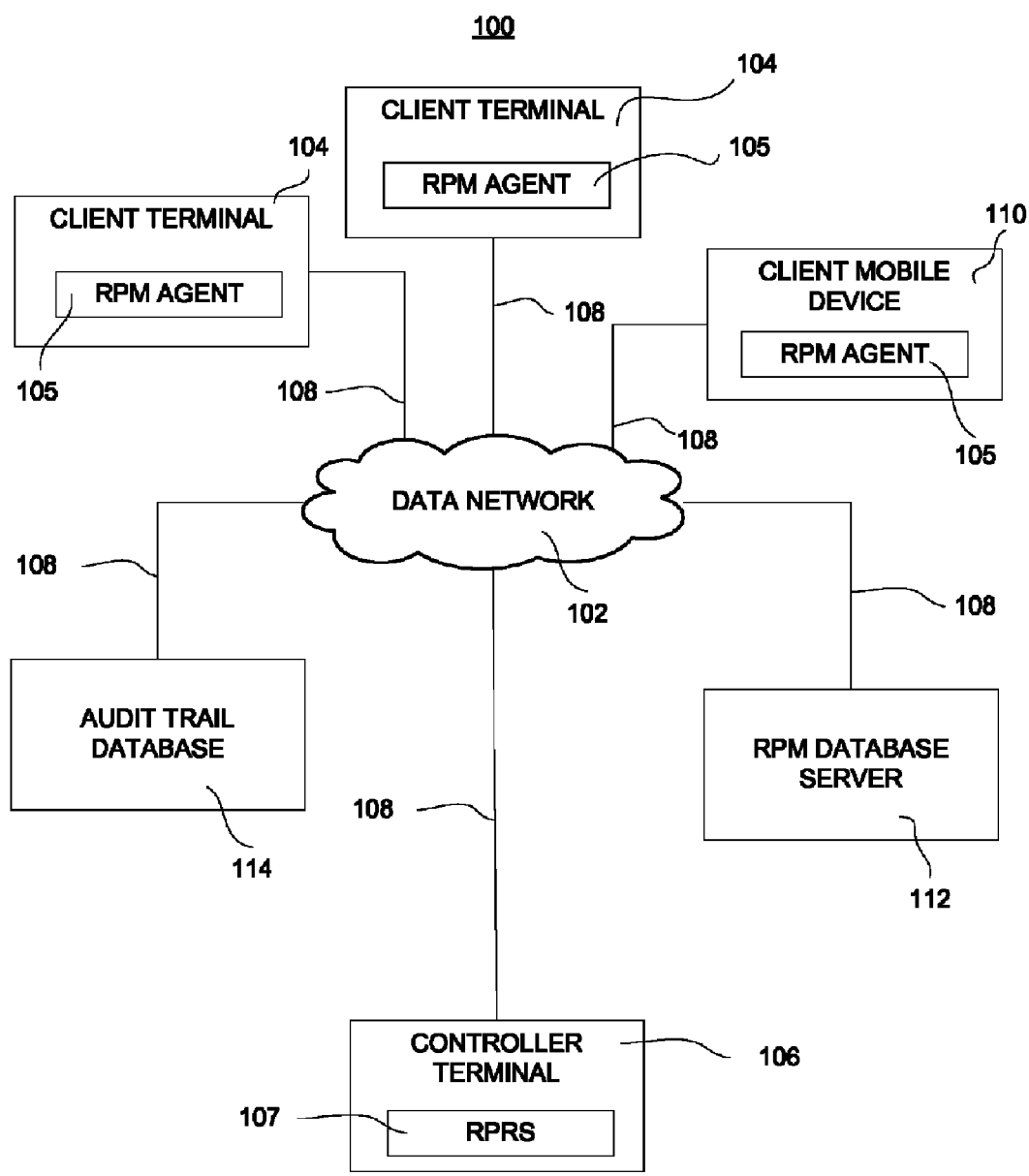
FIG. 1 illustrates a block diagram of an exemplary communication system for implementing the random password management scheme described in accordance with preferred embodiments of the present invention.

An exemplary system 100 for implementing the password management processes of the present invention is illustrated in FIG. 1. In accordance with a preferred embodiment of the present invention, system 100 may be comprised of a data network 102, one or more client terminals 104 configured with a random password management (RPM) agent 105, one or more mobile devices 110 configured with RPM agent 105, one or more database servers 112, 114 and one or more controller terminals 106 configured with a random password recovery system (RPRS) application 107. Client terminals 104, mobile devices 110, database servers 112, 114 and controller terminal 106 are coupled to data network 102 via a communication means 108. Communication means 108 may be achieved through the use of any well-known wired and wireless networking and data management protocols.

RPM database server 112 may be configured for maintaining a secure record of breakglass strings and their corresponding computer IDs. Database server 112 can further be configured to perform periodic data collection from a plurality of workstations in a given network. Given that database server 112 may store breakglass strings corresponding to a plurality of workstations in any given network, controller terminal 106 may be configured for querying database server 112. As illustrated in FIG. 1, database server 112 may be queried via communication means 108.

Figure 2:
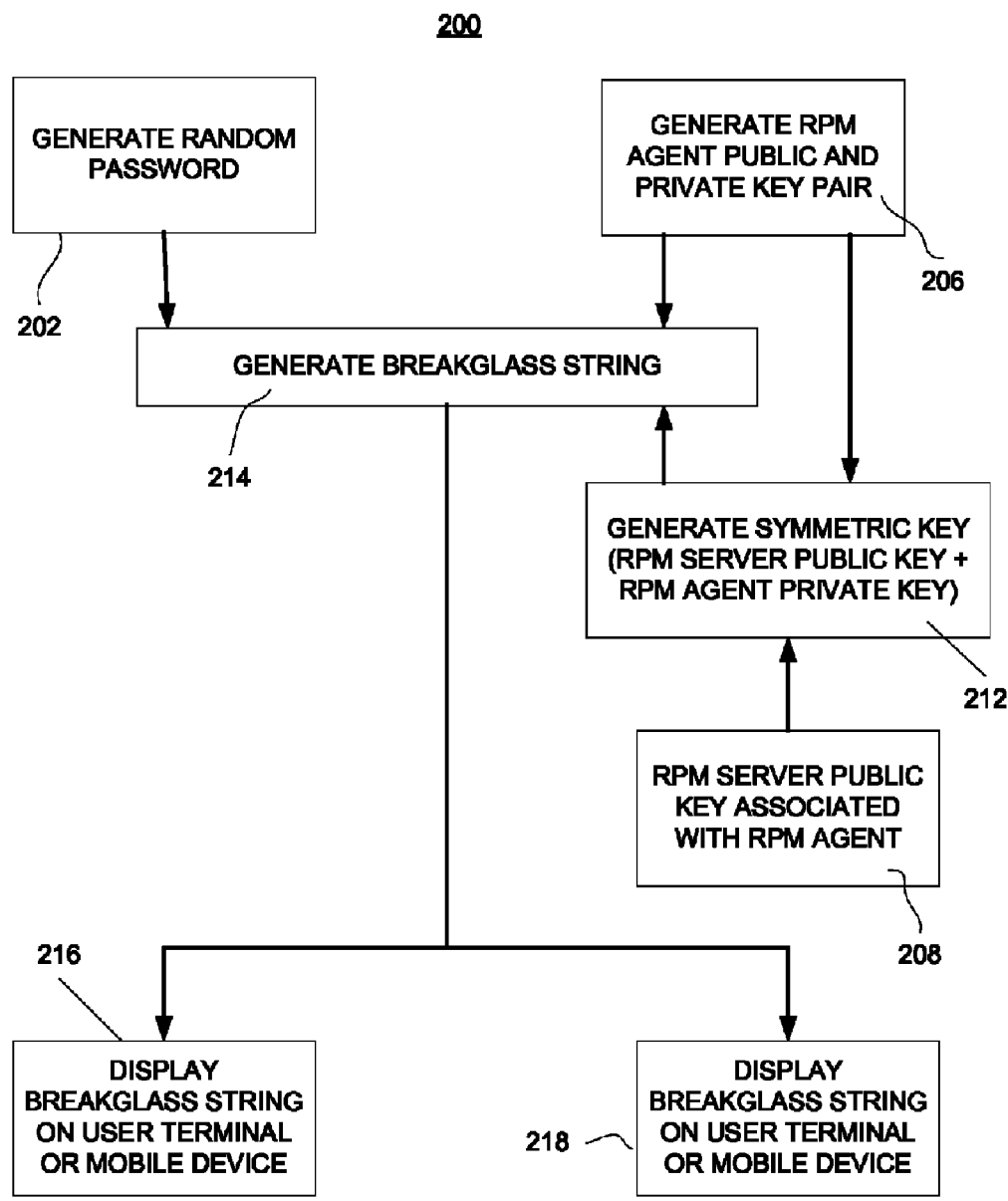
FIG. 2 is a process flowchart for illustrating steps employed in generating a breakglass string in accordance with an embodiment of the present invention.

In FIG. 2, a process flow 200 is provided to illustrate the steps employed in generating a breakglass string. In accordance with a preferred embodiment of the present invention, the breakglass string is a cipher text representative of an encrypted administrator-level password, which may be visibly accessible to a user on a display coupled to client terminal 104 or mobile device 110 or, alternatively, retrievable from RPM database server 112. Process flow 200 may be initiated, for example, when a user logs into terminal 104. Alternatively, process flow 200 may be deployed in accordance with predefined time intervals measured from the instance a user logs onto terminal 104 or, alternatively, from the instance a new administrator-level password is created. Various triggers for initiating process flow 200 may be envisioned and are well within the scope of the present invention.

Upon initiating process flow 200, a unique administrator-level password is randomly generated, at step 202, for a terminal 104 or mobile device 110. The term "administrator-level password" is intended to include, but is not limited to, a string of characters required for gaining unrestricted access to terminal 104 or mobile device 110. The administrator-level password may be an alpha-numeric string generated, for example, by a randomizer application residing on terminal 104, mobile device 110 or a remote server 112 coupled to the same. The randomizer application for generating the administrator-level password may operate as a stand-alone application, but is preferably integrated as part of RPM agent 105.

The randomizer may be configured to generate, at steps 206 and 208, 256 bit elliptic curve key pairs for RPM agent keys and RPM server keys for use in generating a shared symmetric key, at step 212, to encrypt the administrator-level password represented by a breakglass string, at step 214.

When a unique administrator-level password is generated, its use is preferred to be the only means for gaining unrestricted access to the corresponding client terminal 104 or mobile device 110. For example, a helpdesk technician needing to troubleshoot client terminal 104 or mobile device 110 would require knowledge of the unique administrator-level password generated by, and associated with, that particular terminal or mobile device in order to obtain unrestricted access for purposes of troubleshooting. Having generated the administrator-level password for client terminal 104 or mobile device 110, process flow 200 may then transition to the creation of a breakglass string, thereby encrypting the newly created administrator-level password.

The present invention makes use of a symmetric key, generated at step 212, using an RPM agent private key and an RPM server public key associated with RPM agent 105, which are generated and retrieved, respectively, at steps 206 and 208. For example, an Elliptic Curve Diffie-Hellman (ECDH) algorithm may be used in conjunction with the RPM agent private key and RPM server public key of the present invention to generate the symmetric key. Upon generating the symmetric key, its use in combination with an RPM agent public key, also generated at step 206, and the administrator-level password, randomly generated at step 202, results in the generation of the corresponding breakglass string, at step 214.

To encrypt the randomly generated administrator-level password, the Advanced Encryption Standard (AES) and a Base64 encryption may be employed for example. The 256 bit RPM server and private keys generated may be loaded and used in conjunction with the ECDH algorithm to generate the 256 bit shared symmetric key. Thereafter, the AES256 key and the AES initial vector may be generated with the hostname of client terminal 104. The randomly generated administrator-level password may then be encrypted to a 16 byte cipher-text and appended with the 256 bit (32 bytes) elliptic curve RPM agent public key, through use of the x-coordinate of point W in the RPM agent public key. The appended administrator password and RPM agent public key are then subjected to Base64 encoding, whereby the output is the breakglass string. The utilized RPM keys are then deleted and a new pair is generated in the next encryption round.

The breakglass string, generated at step 214, may then be stored, at step 218, in a registry associated with client terminal 104 or mobile device 110 and RPM database server 112 and displayed, at step 216, on client terminal 104 or mobile device 110. The breakglass string is a single-use string for revealing the administrator-level password associated with a particular client terminal 104 or mobile device 110. A user requiring unrestricted access to the particular terminal 104 or mobile device 110 must possess the breakglass string to obtain the administrator-level password. Despite the fact that the breakglass string may be displayed on client terminal 104 or mobile device 110, the breakglass string can not be decrypted to reveal the administrator-level password without knowledge of the unique computer ID associated with client terminal 104 or mobile device 110, and retrieval of a corresponding RPM server private key and the RPM agent public key.

RPM agent 105 deployed on client terminal 104 or mobile device 110 may be configured to remain idle until an authorized user is in need of unrestricted access. Absent unrestricted access of client terminal 104 or mobile device 110, the administrator-level password and corresponding breakglass string may remain unchanged. In accordance with the preferred embodiment of the present invention, client terminal 104 or mobile device 110 are assigned a new administrator-level password immediately upon use of the previously designated administrator-level password or upon expiration of a predetermined time period, whichever occurs first.

Figure 3:
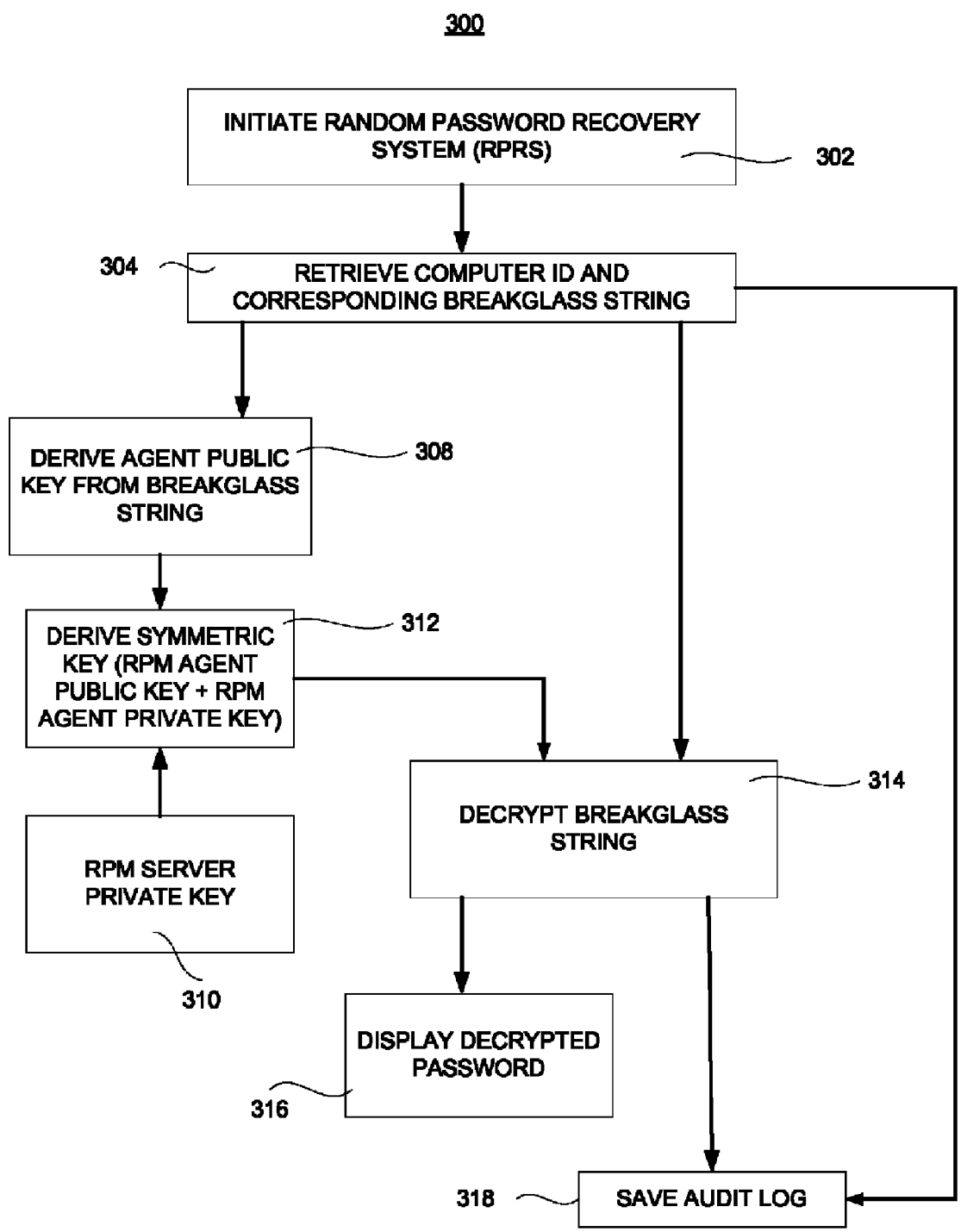
FIG. 3 is a process flowchart for illustrating steps employed in decrypting a breakglass string in accordance with an embodiment of the present invention.

In FIG. 3, a process flow 300 is provided to illustrate the steps employed in deciphering the breakglass string and retrieving the unique administrator-level password needed to gain unrestricted access to client terminal 104 or mobile device 110. RPRS application 107 may be initiated, at step 302, to begin the process of deciphering the breakglass string. RPRS application 107 may be a stand-alone application provided locally on controller terminal 106, as illustrated in FIG. 1. Alternatively, RPRS application 107 may be deployed from a remote location, such as RPM database server 112.

Upon initiating RPRS application 107, at step 302, a computer ID and breakglass string corresponding to client terminal 104 or mobile device 110 is retrieved, at step 304. Thereafter, at steps 308 and 310, the RPM agent public key is derived from the breakglass string and the RPM server private key is retrieved, respectively. The RPM agent public key and RPM server private key are then used, at step 312, to derive the symmetric key needed to decrypt the breakglass string, at step 314. The decrypted administrator-level password is displayed, at step 316, and the corresponding password decryption request is saved, at step 318, in an audit log, which may be maintained, for example, in audit trail database 114.

An audit trail may be kept, at step 318, to log all activity associated with a breakglass string for a particular client terminal 104 or mobile device 110. The implementation of an audit trail further increases security measures provided by the present invention. The audit trail may be configured, for example, to track specific actions taken via RPRS application 107, a corresponding time log of those actions, the location or corresponding computer ID from which a request originated, other applicable information or any suitable combination thereof.

In decrypting the breakglass string the process may begin, for example, with loading the previously described 256 bit elliptic curve RPM server key and performing Base64 decoding on the breakglass string, thereby generating a 16 byte cipher-text and a 32 byte RPM agent public key. The y coordinate of point W in the RPM agent public key may then be calculated to enable reconstruction of the RPM agent public key. With the RPM agent public key and RPM server private key, an ECDH algorithm may then be used to regenerate the shared symmetric key. Having regenerated the symmetric key, AES265 decryption may then be performed on the cipher text representing the administrator password, thereby revealing the unique administrator-level password associated with the client terminal 104 or mobile device 110 for which unrestricted access is required.

It is important to note that upon use of the administrator-level password to gain unrestricted access to client terminal 104 or mobile device 110, RPM agent 105 may be configured to generate a new administrator-level password, rendering the administrator-level password used to gain unrestricted access and the corresponding breakglass string obsolete for future unrestricted access. Therefore, upon use of the administrator-level password corresponding to client terminal 104 or mobile device 110, process flow 200 may be reinitiated to create a new administrator-level password. In an alternative embodiment, a new administrator-level password may be created upon detection that the corresponding breakglass string has been deciphered by RPRS application 107 to reveal the present administrator-level password, irrespective of whether or not the administrator-password was ever used. Such an embodiment may be deployed immediately after deciphering of the breakglass string or after a predetermined lapse of time from the time the breakglass string is deciphered.

Figure 4:
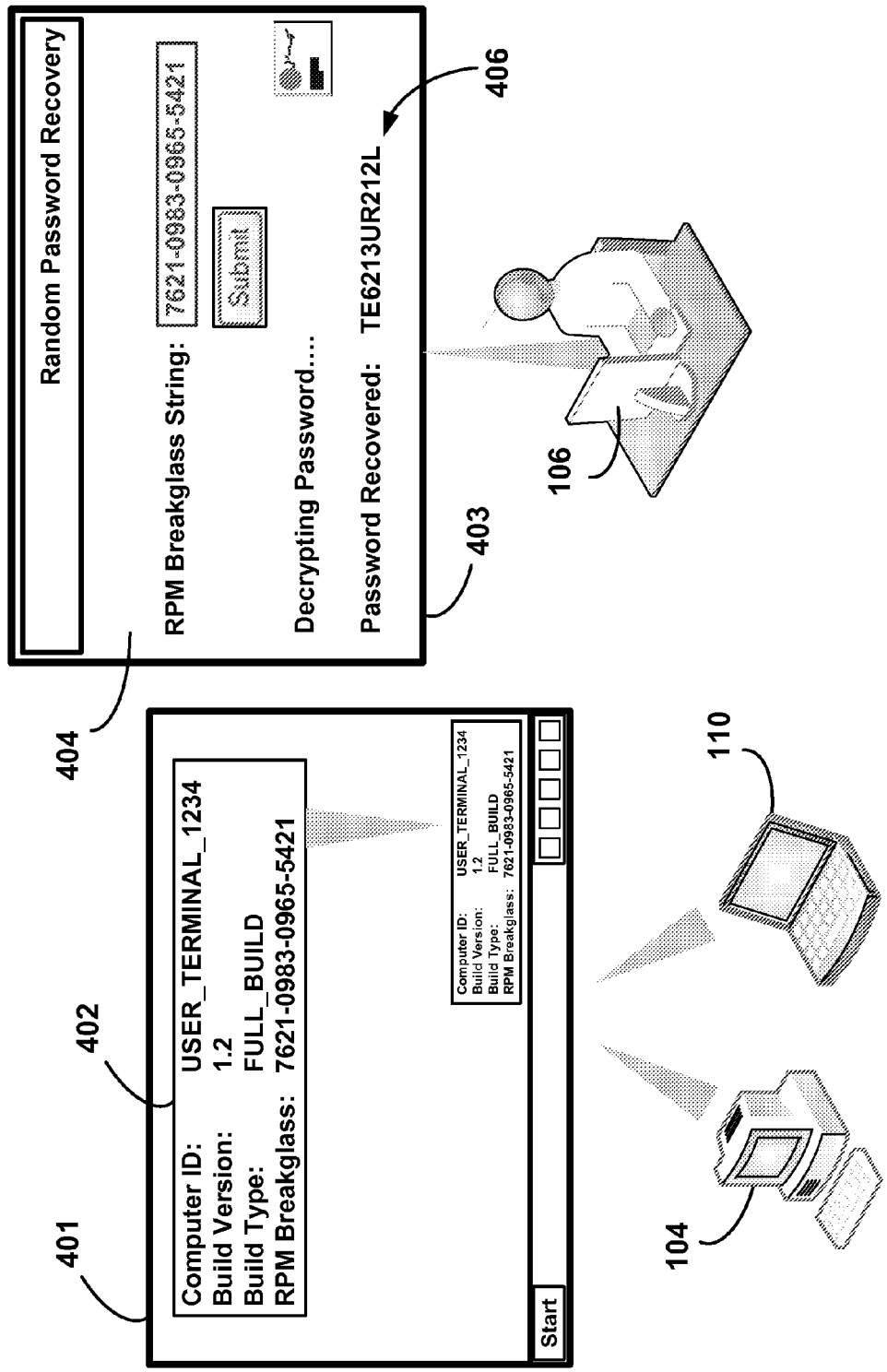
FIG. 4 illustrates exemplary display screens employing random password management consoles in accordance with an embodiment of the present invention.

Exemplary displays of a client RPM agent window 402 and an RPRS application console 404 for, respectively, client terminal 104 or mobile device 110 and controller terminal 106 are illustrated in FIG. 4. When a terminal 104 or a mobile device 110 is accessed by a user, RPM agent 105 may be configured to automatically create a new administrator-level password. Upon encryption of the newly created administrator-level password, as previously described in connection with process flow 200, a breakglass string is stored and displayed, as illustrated in application window 402 provided on a user screen 401.

When unrestricted access to terminal 104 or mobile device 110 is required, the breakglass string displayed in window 402 provided on user screen 401 is retrieved by an authorized user with access to console 404 provided on a user screen 403 of controller terminal 106. In an alternate embodiment, the breakglass string may be retrieved from RPM database server 112 maintaining an inventory of breakglass strings. Once the breakglass string is retrieved, RPRS application 107 may then be used to decrypt the breakglass string, as previously described in connection with process flow 300, and reveal the unique administrator-level password 406, as displayed on console 404. Having obtained the unique administrator-level password, unrestricted access to client terminal 104 or mobile device 110 can now be gained. As previously described, RPM agent 105 may then automatically generate a new administrator-level password for client terminal 104 or mobile device 110.

Thus, a system and method for actively managing and generating unique administrator-level passwords is provided. One skilled in the art will appreciate that the present invention can be practiced by other than the described embodiments, which are presented herein for purposes of illustration and not of limitation, and the present invention is limited only be the claims that follow.

We claim:

1. A computer-implemented method for securing access to a networked user computer, said method comprising:
   generating a random string of characters representative of a first administrator-level password, wherein said first administrator-level password is unique to said networked user computer;
   encrypting said first administrator-level password using a symmetric key, wherein said encrypted first administrator-level password generates a first breakglass string;
   storing said first breakglass string in association with said networked user computer for which said encrypted first administrator-level password was created; and
   upon decryption of said first breakglass string, generating a second administrator-level password for encryption into a second breakglass string of characters.

2. The computer-implemented method of claim 1, wherein said networked user computer is a hardware workstation terminal or mobile device.

3. The computer-implemented method of claim 1, wherein encrypting said first administrator-level password using said symmetric key further comprises:
   identifying said networked user computer for which said first administrator-level password was created;
   generating a public key and a private key associated with said networked user computer;

retrieving a server public key associated with said networked user computer; and generating said symmetric key using said private key and said retrieved server public key.

4. A computer-implemented method for obtaining access to a secured network user computer, said method comprising:

retrieving an encrypted first administrator-level password, wherein said encrypted administrator-level password is represented by a first breakglass string unique to said secured network user computer;

decrypting said first breakglass string using a symmetric key; and revealing said first administrator-level password for obtaining unrestricted access to said secured network user computer, wherein upon decryption of said first administrator-level password, a second administrator-level password for encryption into a second breakglass string is generated.

5. The computer-implemented method of claim 4, wherein retrieving said encrypted administrator-level password further comprises the steps of:

accessing a secure network database, said secure network database configured to store an encrypted administrator-level password for a plurality of secured network user computers; and querying said secure network database for said encrypted first administrator-level password corresponding to said unique system identifier for said secured network user computer to which unrestricted access is desired.

6. The computer-implemented method of claim 4, wherein decrypting said first breakglass string using said symmetric key further comprises the steps of:

retrieving a unique system identifier for said secured network user computer;

deriving a public key, wherein said public key is derived from said first breakglass string;

retrieving a server private key associated with said networked user computer; and generating said symmetric key using said derived public key and said retrieved server private key.

7. The computer-implemented method of claim 4, wherein upon use of said first administrator-level password for obtaining unrestricted access to said secured network user computer, said first administrator-level password is rendered obsolete for future use.

8. The computer-implemented method of claim 4, wherein activities corresponding to said encrypted first administrator-level password are logged to maintain an audit trail.

9. A computer-implemented method for securing access to a networked workstation, said method comprising the steps of:

providing at least one client terminal employing a random password management agent, said random password management agent being configured to generate a random string of characters representative of a first administrator-level password, and further being configured to encrypt said first administrator-level password using a shared symmetric key to generate a first breakglass string of characters;

providing at least one database server configured to store said first breakglass string of characters in association with a client terminal for which the first administrator-level password was encrypted; and providing at least one controller terminal employing a random password recovery system application, said random password recovery system application retrieving said first breakglass string of characters and deriving said symmetric key to decrypt said first breakglass string of characters and reveal said first administrator-level password;

wherein upon decryption of said first administrator-level password, said random password management agent employed by said client terminal is configured to generate a second administrator-level password for encryption into a second breakglass string of characters and render said first administrator-level password obsolete.

* * * * *